United States Patent [19]

Cosier et al.

[11] 4,207,428
[45] Jun. 10, 1980

[54] TELECOMMUNICATIONS SUBMARINE CABLE ASSEMBLIES

[75] Inventors: James E. H. Cosier, Woodbridge; Peter D. Jenkins, Framlingham, both of England

[73] Assignee: Post Office, London, England

[21] Appl. No.: 915,298

[22] Filed: Jun. 13, 1978

[30] Foreign Application Priority Data

Jun. 16, 1977 [GB] United Kingdom ............. 25219/77

[51] Int. Cl.² .................................................. H02G 15/14
[52] U.S. Cl. ..................................... 174/70 S; 174/89
[58] Field of Search ................................ 174/70 S, 89

[56] References Cited

U.S. PATENT DOCUMENTS

| | | | |
|---|---|---|---|
| 2,110,457 | 3/1938 | Wentz | 174/70 S |
| 2,292,358 | 8/1942 | Bishop | 174/70 S |
| 2,352,158 | 6/1944 | Bishop | 174/70 S |
| 2,471,046 | 5/1949 | Smith et al. | 174/70 S |
| 2,667,531 | 1/1954 | McLoad | 174/70 S |
| 3,349,163 | 10/1967 | Rocton | 174/70 S |
| 3,600,499 | 8/1971 | Hibbs | 174/70 S |
| 3,610,812 | 10/1971 | Furusawa | 174/70 S |
| 3,780,210 | 12/1973 | Rocton | 174/70 S |

*Primary Examiner*—B. A. Reynolds
*Assistant Examiner*—E. F. Borchelt
*Attorney, Agent, or Firm*—Mason, Fenwick & Lawrence

[57] ABSTRACT

A submarine telecommunications cable assembly includes a section of main submarine telecommunications cable electrically connected to a short length of cable extending from a repeater housing, the section of main cable being armoured at least in the proximity of the repeater. The electrical connection of the section of cable to the short length of cable extending from the repeater housing is positioned at a location spaced from the repeater housing and strengthening means are provided along the short length of cable substantially increasing the flexural rigidity of the short length of cable. The armouring of the main section of cable extends over the short length of cable and the strengthening means and is anchored to the repeater housing.

11 Claims, 4 Drawing Figures

TELECOMMUNICATIONS SUBMARINE CABLE ASSEMBLIES

This invention relates to improvements in or relating to telecommunications submarine cable assemblies and in particular to an improved arrangement for the connection of a repeater in such a cable assembly.

In submarine cable assemblies of British design, the main cable is electrically connected to the repeater housing by means of connection to a very short length of coaxial cable extending through the repeater housing. The size of the main cable to be connected to the repeater varies in diameter from 0.62 inches (1.57 cm) to 1.7 inches (4.32 cm) according to the particular cable used while the short length of cable extending from the repeater housing is of diameter 0.310 inches (0.787 cm). In order to connect the main cable to the cable extending from the repeater one requires a connecting device which provides electrical connection between the inner and outer conductors of the cables and also mechanical connection between the main cable and the repeater housing. The mechanical connection must be such that the electrical connection of the main cable to the repeater remains serviceable throughout all laying and recovery operations; it is also important that the conductors of the cable be sealed against the ingress of water.

The connecting device used to achieve the connection described above is known as a termination.

In the past such a termination for armoured cable has generally consisted of a copper ferrule interconnecting the central conductors of the main cable and the repeater cable, a tapered dielectric moulding located between the larger diameter core of the main cable and the smaller diameter core of the repeater cable, and a braided conductor surrounding the moulding to provide electrical continuity of the outer conductor. The armouring is mechanically connected to the repeater housing. It should be appreciated that even lightweight cables are usually armoured for a distance of ten fathoms (18.3 meters) on either side of a repeater. This armouring bears any tensile load on the cable in the vicinity of a repeater, the tensile load being progressively transferred to a central strength member by shear forces across the various layers of the cable so that the tensile load is borne by the strength member where the cable ceases to be armoured.

During laying or recovery of a submarine cable assembly (the assembly comprising lengths of cable interconnected by repeaters) the cable assembly, under considerable tension, passes over a bowsheave of a ship. As a repeater passes over the bowsheave, the rigid repeater does not flex and therefore the cable is flexed to such an extent that the axis of the cable adjacent to the repeater and the axis of the repeater become inclined at an angle in the region of 90° so that severe strains are imposed on the cable at the point of maximum bending which is adjacent to the repeater. These strains may give rise to certain fault conditions: for example, the continuity of the outer conductor path may be impaired, or the inner conductor may be caused to move longitudinally within the dielectric dragging the copper ferrule with it and thus producing voids at the interfaces both of the copper ferrule and the inner conductor and of the copper ferrule and the dielectric. Such voids are undesirable as they are liable to cause deterioration of the dielectric or ionize and produce discharges which may interfere with digital transmissions.

It is an obejct of the invention to provide an improved arrangement for the connection of a repeater to a submarine telecommunications cable.

According to the invention there is provided a submarine telecommunications cable assembly including a section of main submarine telecommunications cable electrically connected to a short length of cable extending from a repeater housing, the section of main cable being armoured at least in the proximity of the repeater, wherein the electrical connection of the section of main cable to the short length of cable extending from the repeater housing is positioned at a location spaced from the repeater housing, strengthening means are provided along said short length of cable, the strengthening means substantially increasing the flexural rigidity of said short length of cable to a value greater than the flexural rigidity of the main section of cable, and the armouring of the main section of cable extends over the short length of cable and the strengthening means and is anchored to the repeater housing.

The strengthening means may terminate substantially at said location.

Said location may be spaced from the repeater housing by a distance in the range of 1 foot (30 cm) to 3 feet (90 cm). The distance should be sufficiently long to prevent the electrical connection of the main coaxial cable section to the short length of cable being impaired when the cable assembly is subjected to severe bending stresses, for example, during laying or recovery of the cable assembly; on the other hand an unnecessarily long length of cable extending from the repeater is disadvantageous. In one example of the invention said location is spaced from the repeater housing by a distance of about one and a half feet (45 cm).

The strengthening means is preferably located closely around the outer conductor of the cable.

Preferably the strengthening means provides radial support for the armouring.

The strengthening means may be of generally tubular form. The strengthening means may include a length of relatively stiff tubing, such as a hydraulic hose, providing at least a part of the increase in the flexural rigidity of the strengthened cable length. The strenghtening means may include a coil spring providing at least a part of the increase in the flexural rigidity of the strengthened cable length. The strengthening means may include a plurality of abutting discs each of generally annular form and being resiliently deformable in response to flexing forces on the structure.

The main cable and the short length of cable may be coaxial cable. Alternatively the main cable and the short length of cable may be fibre-optic cables.

By way of example only, certain illustrative embodiments of the invention will now be described with reference to the accompanying drawings, of which:

Figure 1:
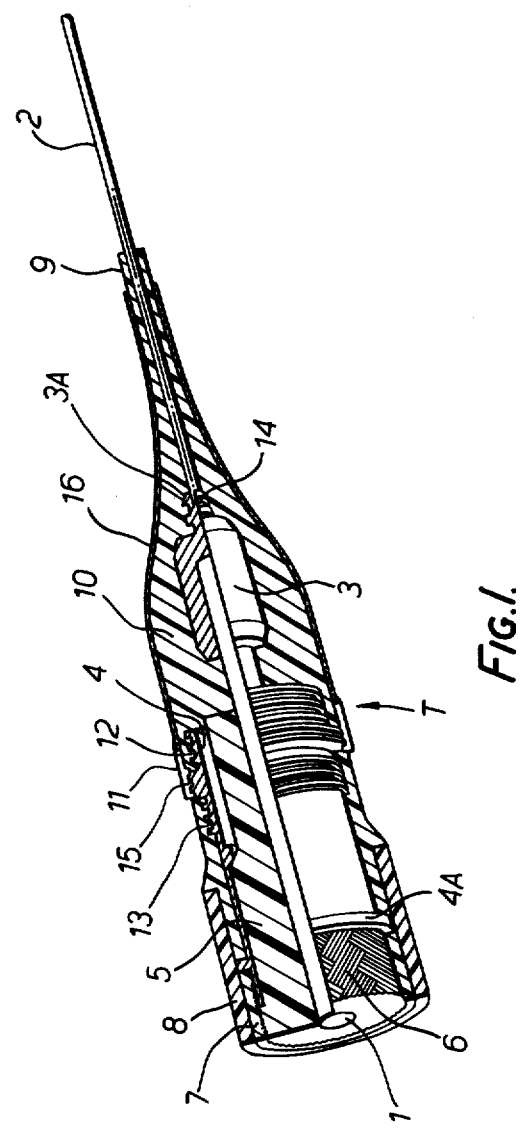
FIG. 1 is a perspective view partly broken away of part of a conventional termination.

Referring first to FIG. 1 the conventional termination shown and generally referenced T includes a copper ferrule 3 connecting an inner conductor 1 of a lightweight telecommunications coaxial cable having a dielectric 5 to the inner conductor 2 of a very short length of cable extending from a repeater housing (not shown) and having a dielectric 9 and a core diameter of 0.310 inches (0.787 cm).

At the end of the lightweight cable the diameter of the dielectric 5 is reduced. An electrically conducting tube 4 with a flanged end 4A fits over the dielectric 5 and a tinned copper braid 6 is soldered to the flanged end 4A. The braid 6 is surrounded by a polyethylene packing piece 7 which in turn is enclosed by a polyethylene sleeve 8. The braid 6 extends a short distance along the core of the lightweight cable and is connected at this distant end to the outer conductor (not shown) of the lightweight cable.

The tube 4 has a grooved outer surface at the end opposite the flanged end 4A. These grooves are arranged to define a circumferential groove 15 into which a plurality of copper tabs 11 are silver soldered. On either side of the tabs 11 further grooves 12 and 13 are provided on the tube 4.

The copper ferrule 3 has a reduced diameter end 3A connected to the conductor 2 and this end of the ferrule has grooves 14.

The cable core 1,5 of the lightweight cable, the cable core 2, 9 of the cable from the repeater housing, the ferrule 3, the tube 4, and the sleeve 8 are all secured together by the injection moulding of additional polyethylene 10 thus forming one continuous polyethylene amalgam incorporating the cable dielectrics 5 and 9, and sleeve 8.

A braid 16 is then soldered onto the copper tabs 11 and extends toward the repeater housing encasing the dielectric 9.

The injected polyethylene is forced into the grooves 12, 13, and 14 to provide hydraulic seals at these interfaces. Thus the tube 4 together with the grooves 12 and 13 prevents any water which penetrates the interface of the tabs 11 and the polyethylene from entering the internal structure of the termination. The grooves 14 form a seal against the ingress of water from the conductor 1 to the conductor 2.

In the past this termination has been disposed immediately adjacent to the end of the repeater housing. The armouring (not shown in FIG. 1) of the cable is passed around a frustoconical anchorage and secured by a tapered ring clamp. This arrangement will be more fully described with reference to FIGS. 3 and 4.

During laying or recovery of a repeater over a bow-sheave of a ship the maximum bending stresses in the cable occur, as already described, adjacent to the ends of the repeater, so that in the cable assembly just described the maximum bending stresses occur at the termination moulding T; this may give rise to the fault conditions mentioned earlier; namely impairment of the continuity of the outer conductor path and longitudinal movement of the inner conductor within the dielectric.

A termination embodying the invention will now be described with reference to FIGS. 2 and 3.

The termination shown in FIG. 2 incorporates the termination moulding T just described with reference to FIG. 1 and again electrically connects a lightweight cable having an inner conductor 1 to a cable extending from a repeater housing (not shown in FIG. 2). The inner conductor 2 of the cable from the repeater is surrounded by dielectric 9 and an outer braided conductor 16.

The termination moulding T is encased in a steel tube 22 which is tapered in a direction toward the repeater housing end of the tube. The tube 22 is attached to the termination moulding T by adhesive tape (not shown) wound around the exposed end of the moulding T and the end of the tube 22.

The inner surface of the tapered end of the tube 22 is shaped at 23 to correspond with the shape of the moulding T so that the moulding is snugly received within the tube. The external surface of the tapered end of the tube 22 is provided with a groove 24, a first plurality of stepped flanges 25 and a second plurality of stepped flanges 26 by turning these profiles onto the tube during manufacture.

One end of a hydraulic hose 27 is fitted over the stepped flanges 26 and one end of a second hydraulic hose 28, around the end of which an interlocking sleeve 29 is provided, is fitted over the stepped flanges 25 and closely surrounds the hose 27. The end of the sleeve 29 is swaged down into the groove 24 after the hoses 27, 28 have been located in order to secure the hoses in position. As can be seen from FIG. 2 the cable from the repeater housing is of smaller diameter than the internal diameter of the hose 27 so that the cable is free to move within the hose 27.

Figure 2:
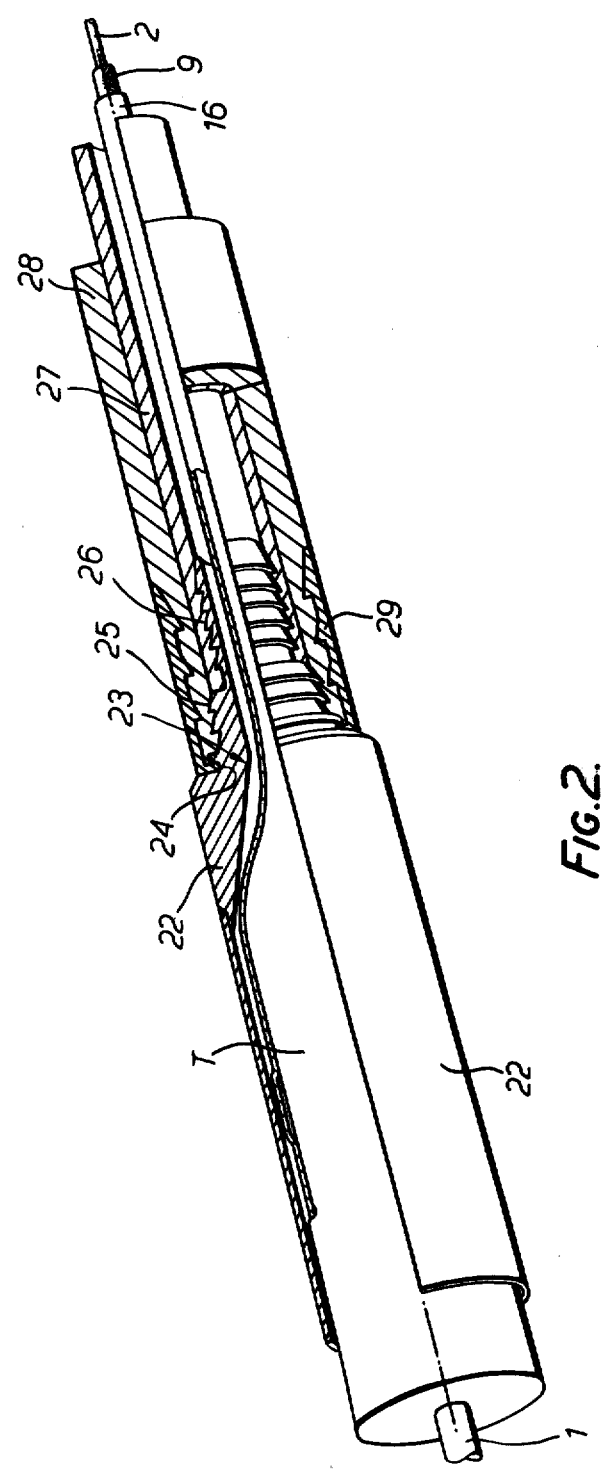
FIG. 2 is a perspective view partly broken away of part of a termination embodying the invention.
Figure 3:
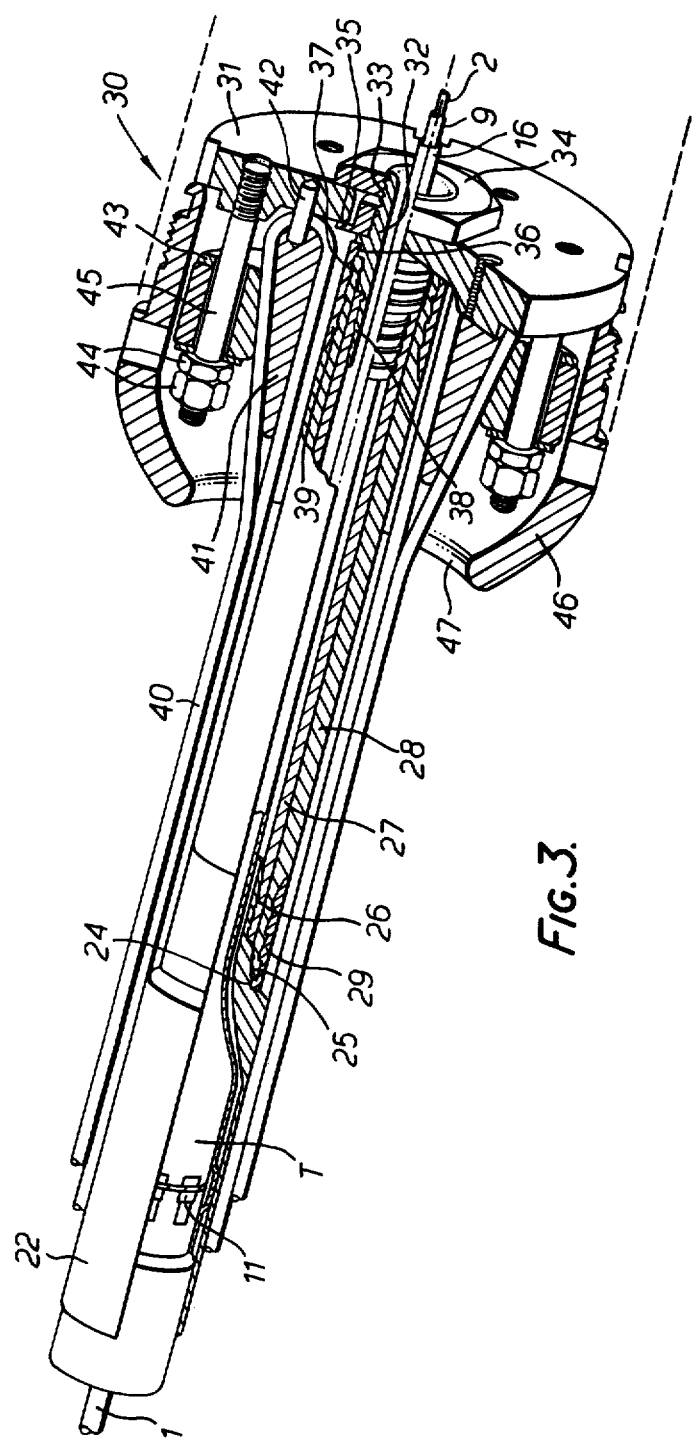
FIG. 3 is a perspective view partly broken away of the termination of FIG. 2 attached to an end of a repeater housing.

Referring now to FIG. 3 which shows the complete termination attached to a repeater housing 30 (only the end part of which is shown, the outline being shown by dotted lines) it will be noted that the parts already described with reference to FIG. 2 are shown on the left hand side of FIG. 3.

The repeater housing 30 has an anchor plate 31 to which the termination is connected in a manner shortly to be described. The anchor plate 31 is provided with a central bore through which the cable comprising inner conductor 2, dielectric 9 and outer braiding 16 is passed.

A generally tubular end fitting 32 has a threaded end 33 which passes through the anchor plate 31 and is secured in place by a nut 34 which draws a flange 35 of the end fitting against the anchor plate 31. The outer end of the tubular end fitting 32 is tapered and provided with a circumferential groove 36, and two series of stepped flanges 37 and 38 in the same manner as the tube 22. The ends of the hydraulic hoses 27 and 28 are secured onto the end fitting 32 by a sleeve 39 the end of which is swaged down into the groove 36 in the same manner as the other ends of the hydraulic hoses are attached to the tube 22 as described with reference to FIG. 2.

FIG. 3 also shows the termination of the cable armouring wires referenced 40 in FIG. 3. The wires 40 are laid over the termination and passed through and around a frusto-conical member 41 torsionally located on the anchor plate 31 by a plurality of fasteners 42. The wires 40 are secured in position by a tapered ring clamp 43 which can be drawn towards the anchor plate 31 by tightening nuts 44 on bolts 45 screwed into the anchor plate 31. The outer hose 28 provides radial support for the armouring wires.

A protective guard 46 is detachably secured to the repeater housing 30 thus clamping the anchor plate 3 and extends a short way along the termination; the distal end of the guard 46 has a smoothly curved edge 47 to prevent the wires 40 being damaged should they rub against the guard 46.

In the embodiment described the connection of the lightweight cable to the cable from the repeater which is made in the termination moulding T is positioned about 18 inches (45 cm) away from the end of the repeater housing.

Figure 4:
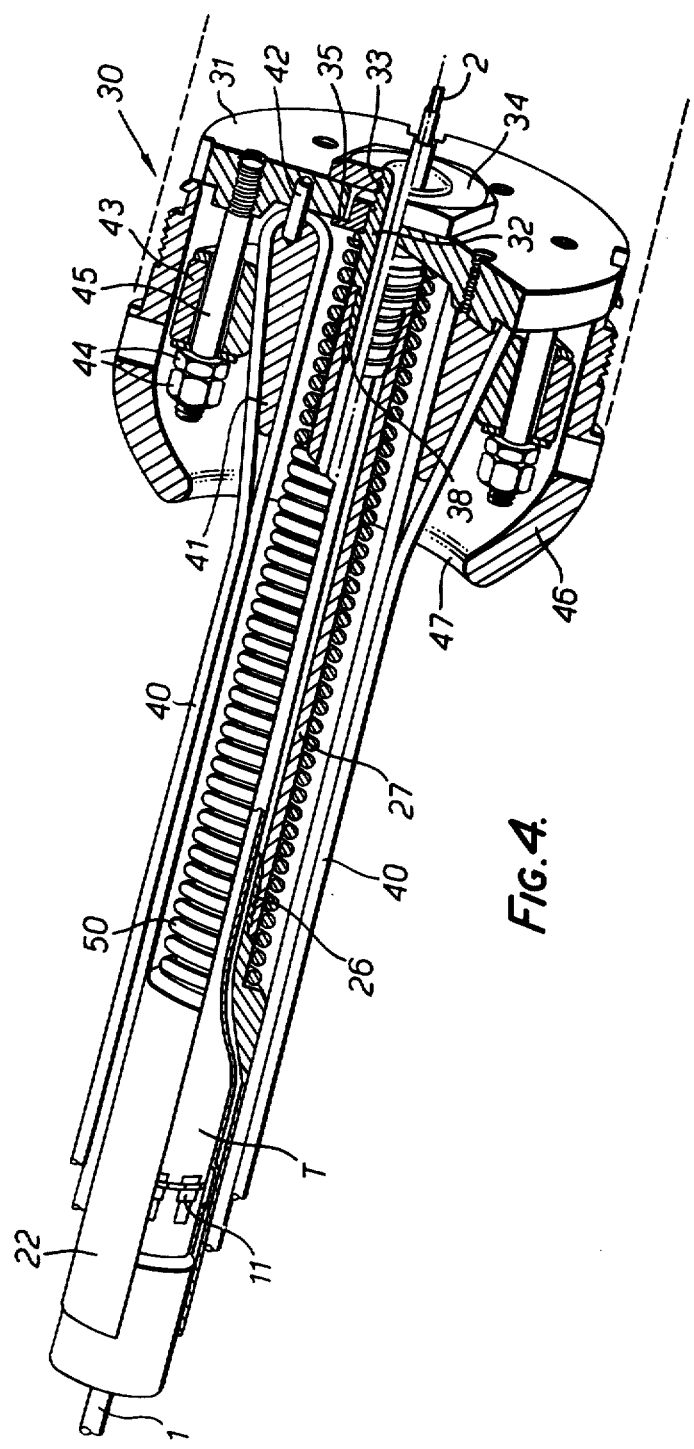
FIG. 4 is a perspective view partly broken away of a modified form of the termination of FIGS. 2 and 3 attached to an end of a repeater housing.

FIG. 4 shows a modified form of the embodiment of FIGS. 2 and 3. The embodiment of FIG. 4 is very similar to the embodiment of FIGS. 2 and 3 and the same reference numerals are used to denote corresponding parts in FIG. 4. The basic modification in FIG. 4 is the replacement of the outer hydraulic hose 28 by a helical coil spring 50.

As a result of the provision of the coil spring the series of flanges 25 and 37 on the tube 22 and the end fitting 32 respectively are not required and the hydraulic hose as a standard assembly can now be used; the hose 27 can be secured at each end by a union nut engaging an annular section threaded spigot.

A small amount of flexing of the coil spring 50 is tolerated by adjacent coils on one side of the spring closing together while the adjacent coils on the other side open up. However once the adjacent coils are touching along one side further flexing of the spring can only be accomodated by the coils on the other side opening up so that the flexural rigidity of the spring approximately doubles. Thus by a suitable choice of the spring, the stengthening structure can be arranged to exhibit relatively little flexural rigidity for gentle bends but substantial flexural rigidity for sharp bends. The spring 50 is sized to provide radial support for the armouring wires 40.

It will be seen that in both embodiments of the invention the connection of the main submarine cable to the cable extending from the repeater housing is spaced by about 18 inches (45 cm) from the end of the repeater so that the bending stress on the termination moulding T as the repeater passes over a sheave is very greatly reduced.

Also the section of cable between the termination moulding T and the repeater housing, which section suffers the greatest bending stresses when a repeater passes over a sheave, is protected by flexible tubular structures which increase the flexural rigidity of this part of the cable and which also provide radial support for the armour wires.

The improved protection for the cable provides that should the cable have to be recovered after laying this can be done without damage to the cable or the repeater and the cable can be re-laid without any repair of these parts.

Furthermore, since the cable in the vicinity of the repeater housing is of 0.310 inches (0.787 cm) core diameter whatever size of cable is being connected, the structure at the end of the repeater housing can be standardized. Whereas with known arrangements 4 different sizes of the clamp 43, and seven different sizes of the frusto-conical member 41 have to be provided for the various types and sizes of cable, with the assemblies described above the only three different sizes of frusto-conical member 41 and one size of the clamp 43 need be provided for all types and sizes of coaxial cable. This reduces the costs of maintaining stocks of spare parts and of manufacturing.

The description above relates to coaxial telecommunications cable. The invention is also, however, applicable to cables other than those of conventional coaxial construction, for example cables of a fibreoptic nature.

The strengthening means between the termination moulding T and the repeater housing may be of various different forms. For example, instead of using hydraulic hoses or coil springs the tubular structures may comprise a plurality of abutting discs each of generally annular form and being resiliently deformable in response to flexing forces on the structure. Also, any appropriate combination of strengthening structures may be used, for example two springs or one hydraulic hose and a plurality of abutting discs.

What is claimed is:

1. A submarine telecommunications cable assembly including a section of a main submarine telecommunications cable electrically connected to a short length of cable extending from a repeater housing, the section of main cable being armoured at least in the proximity of the repeater, wherein the electrical connection of the section of main cable to the short length of cable extending from the repeater housing is positioned at a location spaced from the repeater housing, strengthening means are provided along said short length of cable, the strengthening means substantially increasing the flexural rigidity of said short length of cable to a value greater than the flexural rigidity of the section of main cable, and the armouring of the section of main cable extends over the short length of cable and the strengthening means and is anchored to the repeater housing.

2. An assembly according to claim 1 in which the strengthening means terminates substantially at said location.

3. An assembly according to claim 1 in which said location is spaced from the repeater housing by a distance in the range of 1 foot (30 cm) to 3 feet (90 cm).

4. An assembly according to claim 3 in which said location is spaced from the repeater housing by a distance of about one and a half feet (45 cm).

5. An assembly according to claim 1 in which the strengthening means provides radial support for the armouring.

6. An assembly according to claim 1 in which the strengthening means is of generally tubular form.

7. An assembly according to claim 6 in which the strengthening means includes a length of relatively stiff tubing, such as a hydraulic hose, providing at least a part of the increase in the flexural rigidity of the strengthened cable length.

8. An assembly according to claim 6 in which the strengthening means includes a plurality of abutting discs each of generally annular form and being resiliently deformable in response to flexing forces on the structure.

9. An assembly according to claim 1 in which the main cable and the short length of cable are coaxial cables.

10. An assembly according to claim 9 in which the strengthening means is located closely around the outer conductor of the short length of cable.

11. An assembly according to any of claim 1-7 or 9 in which the main cable and the short length of cable are fibre-optic cables.

* * * * *